(12) United States Patent
Kalach et al.

(10) Patent No.: US 10,216,759 B2
(45) Date of Patent: Feb. 26, 2019

(54) HETEROGENEOUS FILE OPTIMIZATION

(75) Inventors: Ran Kalach, Bellevue, WA (US);
Mathew James Dickson, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 774 days.

(21) Appl. No.: 12/951,760

(22) Filed: Nov. 22, 2010

(65) Prior Publication Data

US 2012/0130958 A1    May 24, 2012

(51) Int. Cl.
*G06F 7/00* (2006.01)
*G06F 17/30* (2006.01)

(52) U.S. Cl.
CPC .. *G06F 17/30233* (2013.01); *G06F 17/30091* (2013.01)

(58) Field of Classification Search
CPC ............... G60F 17/30233; G60F 17/30091
See application file for complete search history.

(56) References Cited

U.S. PATENT DOCUMENTS

| | | | |
|---|---|---|---|
| 5,813,008 | A | 9/1998 | Benson et al. |
| 6,389,433 | B1 | 5/2002 | Bolosky et al. |
| 6,993,520 | B2 | 1/2006 | Doyle et al. |
| 8,140,491 | B2 * | 3/2012 | Mandagere et al. .......... 707/692 |
| 2002/0107877 | A1 | 8/2002 | Whiting et al. |
| 2002/0133491 | A1 * | 9/2002 | Sim et al. ....................... 707/10 |
| 2004/0059758 | A1 | 3/2004 | Faiman et al. |
| 2007/0226443 | A1 | 9/2007 | Giampaolo |
| 2008/0104107 | A1 | 5/2008 | Schwaab et al. |
| 2008/0155192 | A1 | 6/2008 | Iitsuka |

(Continued)

FOREIGN PATENT DOCUMENTS

WO    2010103569 A1    9/2010

OTHER PUBLICATIONS

Zhu, et al., "Avoiding the Disk Bottleneck in the Data Domain Deduplication File System", Retrieved at <<http://www.modcomp.com/pdf/Whitepapers/Storage/Data Domain/Data Domain—Avoiding the Disk Bottleneck.pdf>>, Proceedings of the 6th USENIX Conference on File and Storage Technologies, 2008, pp. 1-14.

(Continued)

*Primary Examiner* — Usmaan Saeed
*Assistant Examiner* — Paul Kim
(74) *Attorney, Agent, or Firm* — Wade IP Law LLC

(57) ABSTRACT

Techniques are described herein that are capable of heterogeneously optimizing a file. Heterogeneous optimization involves optimizing regions of a file non-uniformly. For example, the regions of the file may be optimized to different extents. In accordance with this example, a different optimization technique may be used to optimize each region or subset of the regions. In one aspect, optimization designations are assigned to respective regions of a file based on access patterns that are associated with the respective regions. The file may be a database file, a virtualized storage file, or other suitable type of file. Each optimization designation indicates an extent to which the respective region is to be optimized. Each region may be optimized to the extent that is indicated by the respective optimization designation that is assigned to that region.

24 Claims, 5 Drawing Sheets

(56) References Cited

U.S. PATENT DOCUMENTS

| | | | |
|---|---|---|---|
| 2008/0162523 A1 | 7/2008 | Kraus et al. | |
| 2009/0265506 A1 | 10/2009 | Yim | |
| 2010/0125553 A1* | 5/2010 | Huang et al. | 707/661 |
| 2010/0274772 A1* | 10/2010 | Samuels | G06F 17/30233 |
| | | | 707/693 |

OTHER PUBLICATIONS

Komiega, Kevin, "Quantum Adds Deduplication to StorNext Software", Retrieved at <<http://www.infostor.com/index/articles/display/1507602046/articles/infostor/storage-management/data-de-duplication/2010/january-2010/quantum-adds_deduplication.html>>, Jan. 20, 2010, pp. 2.

Bhagwat, et al., "Extreme Binning: Scalable, Parallel Deduplication for Chunk-based File Backup", Retrieved at <<http://www.hpl.hp.com/techreports/2009/HPL-2009-10R2.pdf>>, Published in IEEE Mascots, Sep. 21, 2009, pp. 10.

Correia, Edward J., "Quantum Adds Deduplication to StorNext 4.0", Retrieved at <<http://www.networkcomputing.com/print_entry.php?eid=84606>>, Jan. 22, 2010, pp. 2.

Carman, et al., "Towards an Economy-based Optimisation of File Access and Replication on a Data Grid", Retrieved at <<http://bradipo.net/mark/papers/ccgrid2002.pdf >>, May 21-24, 2002, pp. 1-6.

International Search Report and Written Opinion received for PCT Application No. PCT/US2011/058679, dated Jul. 2, 2012, 8 pages.

"Third Office Action Issued in Chinese Patent Application No. 201110386132.9", dated Jan. 19, 2015, 6 Pages.

"Office Action and Search Report Received for Chinese Patent Application No. 201110386132.9", dated Dec. 30, 2013, 12 Pages.

"Office Action Received for Chinese Patent Application No. 201110386132.9", dated Sep. 5, 2014, 7 Pages.

"Supplementary Search Report Issued in European Patent Application No. 11842522.2", dated Nov. 22, 2016, 11 Pages.

Hsu, et al., "Automatic Synthesis of Compression Techniques for Heterogeneous Files", Published in Software-Practice and Experience, vol. 25, Issue 10, Oct. 1995, pp. 1097-1116.

"Office Action Issued in European Patent Application No. 11842522.2", dated Nov. 22, 2017, 8 Pages.

* cited by examiner

HETEROGENEOUS FILE OPTIMIZATION

BACKGROUND

Data optimization is the act of reducing an amount of data that is stored on a storage device (e.g., a disk) or transmitted across a network without compromising the fidelity and integrity of the original data. Data optimization often involves a combination of techniques for eliminating redundancy in and between persistently stored files. Data de-duplication (dedup) is one such technique in which identical regions (a.k.a. chunks) of data in one or more files are stored as a single region. Compression is another such technique in which data is encoded to include fewer bits (or other information-bearing units) than the original data.

Once data is optimized, the data may be accessed by reversing the effects of the optimization (i.e., de-optimizing the optimized data), for example by performing an inverse dedup operation and/or a decompression operation with respect to the optimized data. However, de-optimization causes a delay with respect to accessing the data. A greater amount of data results in a longer latency. Moreover, such latency may occur each time the data is accessed unless a de-optimized version of the data is stored for access on a storage device. Furthermore, de-optimization often consumes substantial resources (e.g., memory, central processing unit (CPU), disk I/O, etc.) of a device, which may negatively affect a main workload that is running on the device. Accordingly, frequent de-optimization may result in relatively inefficient utilization of the device's resources.

For example, if data in a file is fully optimized, the latency that is associated with accessing the data may unduly degrade the performance of a device that accesses the data and/or a workload that is running on the device, especially if the data is frequently accessed. In another example, it may not be desirable to optimize some regions of a file and/or some types of data. However, the various regions of the file may not be visible to a device that attempts to optimize the file. Accordingly, the device may have no way to know whether the regions of the file are optimizable.

SUMMARY

Various approaches are described herein for, among other things, heterogeneously optimizing a file. Heterogeneous optimization involves optimizing regions of a file non-uniformly. For example, the regions of the file may be optimized to different extents. In accordance with this example, a different optimization technique may be used to optimize each region or subset of the regions.

An example method is described in which optimization designations are assigned to respective regions of a file based on access patterns that are associated with the respective regions. Each optimization designation indicates an extent to which the respective region is to be optimized. Each region is optimized to the extent that is indicated by the respective optimization designation that is assigned to that region.

Another example method is described in which access indicators are assigned to respective regions of a file. The access indicators correspond to respective access patterns that are associated with the respective regions. For example, the access patterns may be monitored using a file system filter driver. Optimization designations are assigned to the respective regions based on the respective access indicators that are assigned to the respective regions. Each optimization designation indicates an extent to which the respective region is to be optimized. Each region is optimized to the extent that is indicated by the respective optimization designation that is assigned to that region.

Yet another example method is described in which a virtualized storage file that includes multiple regions is mounted to provide a mounted virtualized storage file. The mounted virtualized storage file includes data sequences that correspond to the respective regions. Each data sequence is included in a collection of one or more respective files. A disk filter is executed with respect to the mounted virtualized storage file to monitor an access pattern of each collection. Optimization designations are assigned to the respective regions based on the access patterns of the respective collections that include the corresponding data sequences. Each region is optimized to the extent that is indicated by the respective optimization designation that is assigned to that region.

An example system is described that includes an assignment module and an optimization module. The assignment module is configured to assign optimization designations to respective regions of a file based on access patterns that are associated with the respective regions. Each optimization designation indicates an extent to which the respective region is to be optimized. The optimization module is configured to optimize each region to the extent that is indicated by the respective optimization designation that is assigned to that region.

Another example system is described that includes an assignment module and an optimization module. The assignment module is configured to assign access indicators to respective regions of a file. The access indicators correspond to respective access patterns that are associated with the respective regions. The assignment module is further configured to assign optimization designations to the respective regions based on the respective access indicators that are assigned to the respective regions. Each optimization designation indicates an extent to which the respective region is to be optimized. The optimization module is configured to optimize each region to the extent that is indicated by the respective optimization designation that is assigned to that region.

Yet another example system is described that includes a mounting module, an access monitor, an assignment module, and an optimization module. The mounting module is configured to mount a virtualized storage file that includes multiple regions to provide a mounted virtualized storage file. The mounted virtualized storage file includes data sequences that correspond to the respective regions. Each data sequence is included in a collection of one or more respective files. The access monitor is configured to execute a disk filter with respect to the mounted virtualized storage file to monitor an access pattern of each collection. The assignment module is configured to assign optimization designations to the respective regions based on the access patterns of the respective collections that include the corresponding data sequences. The optimization module is configured to optimize each region to the extent that is indicated by the respective optimization designation that is assigned to that region.

An example computer program product is described that includes a computer-readable medium having computer program logic recorded thereon for heterogeneously optimizing a file. The computer program product includes first and second program logic modules. The first program logic module is for enabling the processor-based system to assign optimization designations to respective regions of a file based on access patterns that are associated with the respective regions. Each optimization designation indicates an extent to which the respective region is to be optimized. The second program logic module is for enabling the processor-based system to optimize each region to the extent that is indicated by the respective optimization designation that is assigned to that region.

Another example computer program product is described that includes a computer-readable medium having computer program logic recorded thereon for heterogeneously optimizing a file. The computer program product includes first, second, and third program logic modules. The first program logic module is for enabling the processor-based system to assign access indicators to respective regions of a file. The access indicators correspond to respective access patterns that are associated with the respective regions. The second program logic module is for enabling the processor-based system to assign optimization designations to the respective regions based on the respective access indicators that are assigned to the respective regions. Each optimization designation indicates an extent to which the respective region is to be optimized. The third program logic module is for enabling the processor-based system to optimize each region to the extent that is indicated by the respective optimization designation that is assigned to that region.

Yet another example computer program product is described that includes a computer-readable medium having computer program logic recorded thereon for heterogeneously optimizing a file. The computer program product includes first, second, third, and fourth program logic modules. The first program logic module is for enabling the processor-based system to mount a virtualized storage file that includes multiple regions to provide a mounted virtualized storage file. The mounted virtualized storage file includes data sequences that correspond to the respective regions. Each data sequence is included in a collection of one or more respective files. The second program logic module is for enabling the processor-based system to execute a disk filter with respect to the mounted virtualized storage file to monitor an access pattern of each collection. The third program logic module is for enabling the processor-based system to assign optimization designations to the respective regions based on the access patterns of the respective collections that include the corresponding data sequences. The fourth program logic module is for enabling the processor-based system to optimize each region to the extent that is indicated by the respective optimization designation that is assigned to that region.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
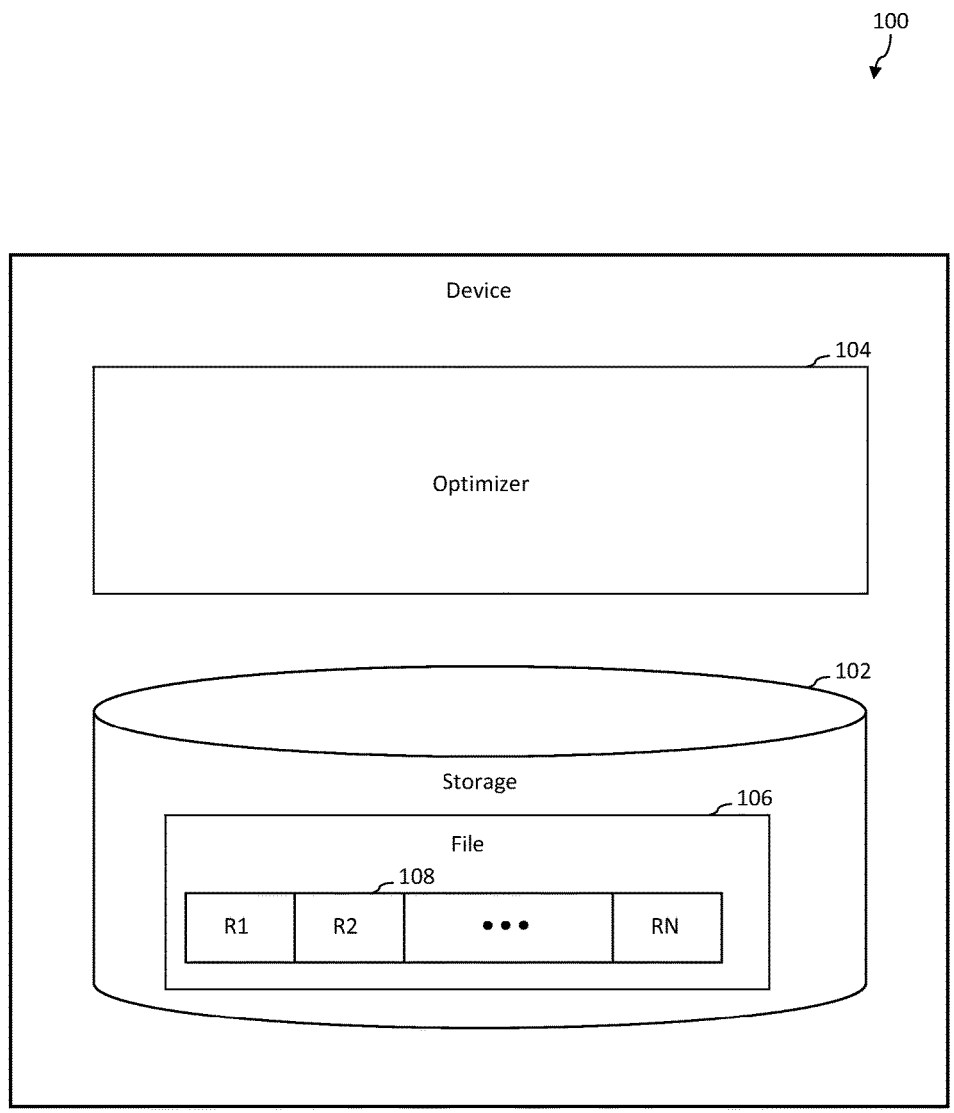
FIG. 1 is a block diagram of an example device in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of heterogeneously optimizing a file. Heterogeneous optimization involves optimizing regions of a file non-uniformly. For example, the regions of the file may be optimized to different extents. In accordance with this example, a different optimization technique may be used to optimize each region or subset of the regions.

In example embodiments, optimization designations are assigned to respective regions of a file based on access patterns that are associated with the respective regions. An access pattern indicates and/or describes access(es) and/or modification(s) with respect to a region with which the access pattern is associated. The file may be a database file, a virtualized storage file, or other suitable type of file. A database file is a file that includes multiple record files and/or multiple log files. A virtualized storage file is a file that is configured to be mounted as a disk or a volume to provide a file system interface for accessing hosted files. In accordance with these example embodiments, each optimization designation indicates an extent to which the respective region is to be optimized. Each region may be optimized to the extent that is indicated by the respective optimization designation that is assigned to that region.

Optimization designations may be defined in any suitable manner. For instance, a first optimization designation may indicate that a first region of a file is to be compressed but not de-duplicated. A second optimization designation may indicate that a second region is to be de-duplicated but not compressed. A third optimization designation may indicate that a third region is to be compressed and de-duplicated. A fourth optimization designation may indicate that a fourth region is to be neither compressed nor de-duplicated. Fifth and sixth optimization designations may indicate that fifth and sixth regions are to be compressed using respective first and second compression techniques. Seventh and eighth optimization designations may indicate that seventh and eighth regions are to be de-duplicated using respective first and second de-duplication techniques, and so on.

In an example embodiment, each optimization designation indicates a respective optimization policy or a respective optimization level within a global policy. An optimization policy is a set of rules that defines a manner in which regions of a file are to be optimized based on designated criteria. The optimization policy may define multiple optimization levels. Each optimization level indicates one or more data optimization techniques that are to be performed with respect to the regions that satisfy a respective subset of the designated criteria. For example, a first optimization level may indicate that no optimization is to be performed with respect to regions that are associated with the first optimization level. In accordance with this example, the extent to which a region is optimized may increase as the optimization level that is associated with the region increases. In an aspect, increasing an optimization level that is associated with a region may increase storage savings but may consume more computational resources and/or add latency to data access operations that are performed with respect to the region. Accordingly, selecting an optimization level to be associated with a region may involve balancing storage savings with increased resource consumption and/or latency. Such balancing may be based on or influenced by the data optimization technique that provides the greatest optimization for the type of data that is to be optimized. It will be recognized that an optimization designation that indicates an optimization policy may further indicate an optimization level that is defined by that optimization policy.

Example techniques described herein have a variety of benefits as compared to conventional techniques for optimizing a file. For instance, some example techniques may optimize the various regions of a file to different degrees. Some example techniques may partially optimize a file, meaning that one or more regions of the file are not optimized. The time and/or amount of resources that is consumed by a device to access a file that is optimized in accordance with one or more of the example techniques described herein may be less than the time and/or amount of resources that is consumed by the device to access the file if it were optimized using conventional techniques.

FIG. 1 is a block diagram of an example device 100 in accordance with an embodiment. Device 100 is a processing system that is capable of optimizing a file. An example of a processing system is a system that includes at least one processor that is capable of manipulating data in accordance with a set of instructions. For instance, a processing system may be a computer, a personal digital assistant, etc.

Device 100 includes storage 102 and an optimizer 104. Storage 102 stores a file 106. File 106 includes multiple regions 108. File 106 is shown to include a vector of N regions (labeled as R1, R2, . . . , RN) for illustrative purposes and is not intended to be limiting. It will be recognized that file 106 may include any suitable number and/or configuration of regions. For instance, regions 108 need not necessarily be stored contiguously on storage 102. Moreover, a region need not necessarily be stored using contiguous bits of storage 102. Each region may correspond to any suitable offset in file 106. The number of bits in each region may be based on any of a variety of factors, such as an amount of memory that is available for tracking the regions. Each region may include any number of bits (i.e., may be any size), and the number of bits in each region may be the same or different. Furthermore, the number of bits in each region may be fixed or variable.

Regions 108 may be defined based on access patterns that are associated with the regions 108, access indicators that are assigned to the respective regions 108, and/or any other suitable factor(s). An access pattern indicates and/or describes access(es) and/or modification(s) with respect to a region with which the access pattern is associated. For instance, an access pattern may include a time at which a region was most recently accessed, a number of times that the region is accessed, a frequency with which the region is accessed, a time at which the region was most recently modified, a number of times that the region is modified, a frequency with which the region is modified, an indication as to whether the region is accessed during a system boot operation (e.g., with respect to device 100), whether the region is accessed by a specified application (e.g., a database application), etc.

Access patterns may correspond to access indicators. Each access indicator is associated with one or more respective criteria. An access indicator is assigned to a region if an access pattern that is associated with the region satisfies the one or more criteria that are associated with that access indicator. Accordingly, multiple instances of an access indicator may be assigned among the region 108 of file 106, though the scope of the example embodiments is not limited in this respect. Access indicators are discussed in greater detail below with reference to FIGS. 4 and 5.

Optimizer 104 is configured to optimize regions 108 of file 106 based on optimization designations that are assigned to the regions 108. The optimization designations may be based on access patterns that are associated with the regions 108 and/or any other suitable factor(s). Techniques for optimizing regions (e.g., regions 108) are described in detail below with reference to FIGS. 3-6.

Figure 2:
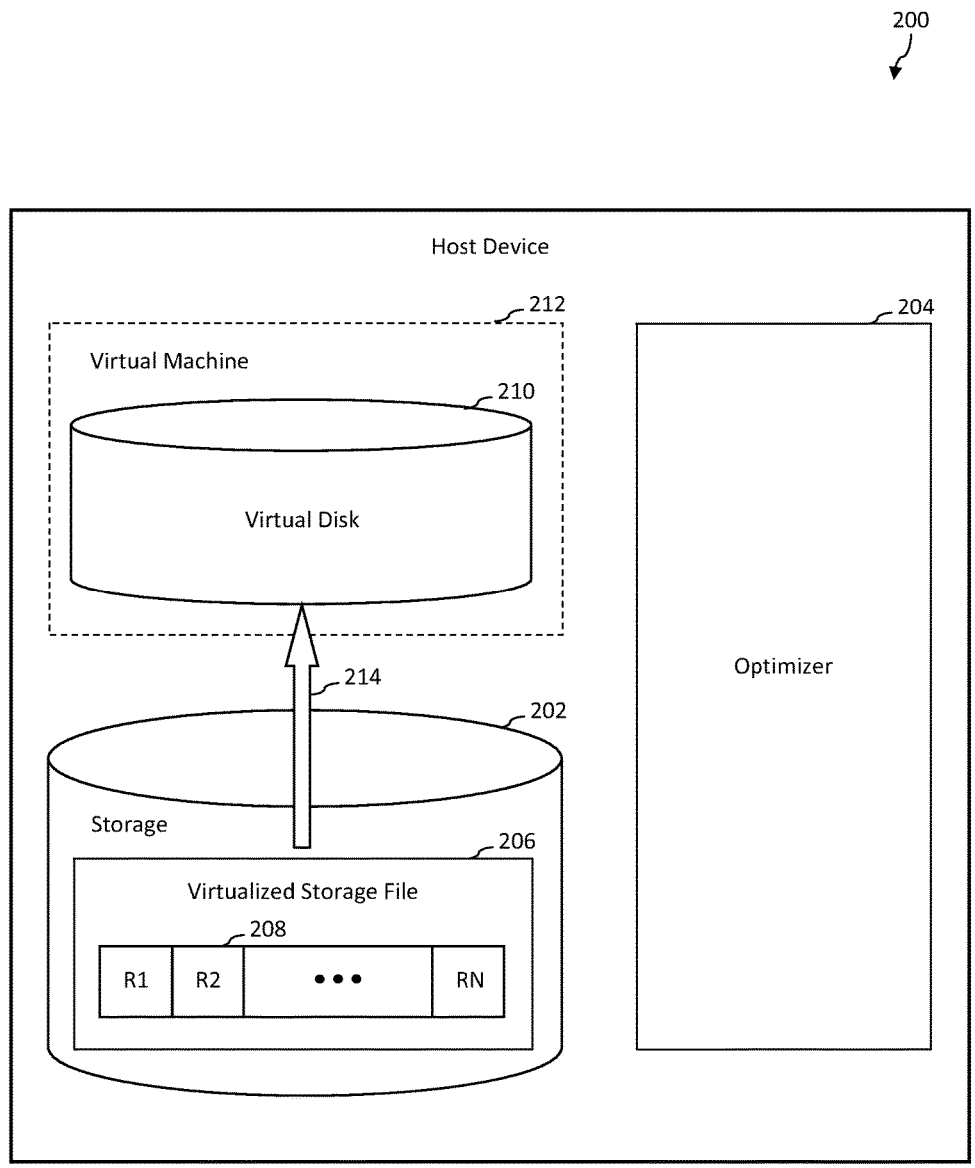
FIG. 2 is a block diagram of an example host device in accordance with an embodiment.

FIG. 2 is a block diagram of an example host device 200 in accordance with an embodiment. Host device 200 is a processing system that is capable of mounting a virtualized storage file to provide a virtual disk. Host device 200 includes storage 202 and an optimizer 204. Storage 202 stores a virtualized storage file 206, which includes multiple regions 208. Regions 208 may be defined based on access patterns that are associated with the regions 208, offsets in virtualized storage file 206 that correspond to hosted files that are stored on a virtual disk (e.g., virtual disk 210), and/or any other suitable factor(s). The number of bits in each region may be based on any of a variety of factors, including but not limited to an average number of bits included in hosted files that correspond to the regions, an amount of memory that is available for tracking the regions, etc. Regions 208 are shown to be arranged as a vector of N regions (labeled as R1, R2, ..., RN) for illustrative purposes and are not intended to be limiting. It will be recognized that virtualized storage file 206 may include any suitable number and/or configuration of regions.

Optimizer 204 is configured to optimize regions 208 of virtualized storage file 206 based on optimization designations that are assigned to the regions 208. The optimization designations may be based on access patterns that are associated with the regions 208, properties of the hosted files, and/or any other suitable factor(s). Example properties of a hosted file include but are not limited to an access pattern of the hosted file, heuristics regarding the hosted file, a classification of the hosted file, a format of the hosted file, a type of the hosted file, an intended use of the hosted file (e.g., whether the hosted file is to be used to execute virtual machine 212 or during a system boot operation with regard to host device 200), whether the hosted file is accessed by a specified application (e.g., a database application), etc. Example formats of a hosted file include but are not limited to an Adobe® PDF format, a Microsoft® Office (e.g., Word®, Excel®, Visio®, etc.) format, a WordPerfect® format, an extensible markup language (XML) format, etc.

In some example embodiments, optimizer 204 is capable of mounting virtualized storage file 206 to provide virtual disk 210, as indicated by arrow 214. Virtual disk 210 is shown in FIG. 2 to be mounted on a virtual machine 212, which is configured to execute on host device 200. It will be recognized, however, that virtual disk 210 may be mounted on host device 200, rather than on virtual machine 212. For example, host device 200 need not necessarily include virtual machine 212. Mounting virtualized storage file 206 on host device 200 or virtual disk 210 may enable optimizer 204 to recognize virtual disk 210 as storage, rather than as a file. For instance, mounting virtualized storage file 206 may enable optimizer 204 to determine logical volume(s) and/or file system(s) that are associated with virtual disk 210 for purposes of optimizing regions 208 or hosted files that are included in virtual disk 210. Techniques for optimizing regions (e.g., regions 208) are described in detail below with reference to FIGS. 3-6.

FIGS. 3-6 depict flowcharts 300, 400, 500, and 600 of example methods for optimizing a file in accordance with embodiments. Flowcharts 300, 400, 500, and 600 may be performed by optimizer 104 of device 100 shown in FIG. 1 and/or by optimizer 204 of host device 200 shown in FIG. 2, for example. For illustrative purposes, flowcharts 300, 400, 500, and 600 are described with respect to an optimizer 700 shown in FIG. 7, which is an example of an optimizer 104 or 204, according to an embodiment. As shown in FIG. 7, optimizer 700 includes an assignment module 702, an optimization module 704, an access monitor 706, and a mounting module 708. Further structural and operational embodiments will be apparent to persons skilled in the relevant art(s) based on the discussion regarding flowcharts 300, 400, 500, and 600. It will be recognized that any one or more of assignment module 702, optimization module 704, access monitor 706, and/or mounting module 708 may be implemented in virtual machine 212.

Figure 3:
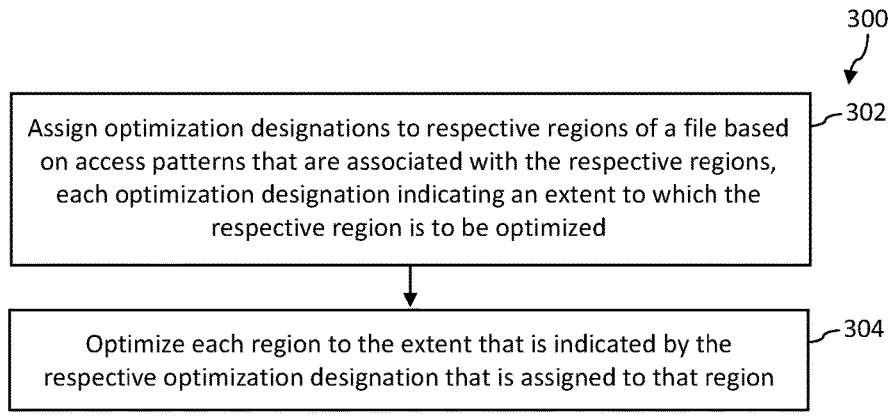
FIGS. 3-6 depict flowcharts of example methods for heterogeneously optimizing a file in accordance with embodiments.

As shown in FIG. 3, the method of flowchart 300 begins at step 302. In step 302, optimization designations are assigned to respective regions of a file based on access patterns that are associated with the respective regions. Each optimization designation may be assigned to the respective region based on any of a variety of factors, including but not limited to a latency that is associated with accessing that region, an amount of system resources (e.g., bandwidth, runtime, etc. of a processor, storage, or network in a system) that is utilized to access that region, whether that region is accessed in response to mounting an operating system that uses that region (e.g., to provide a virtual disk), whether that region is accessed by a specified application (e.g., a database application), etc. The file may be a virtualized storage file, a database file, or other suitable type of file. Each optimization designation indicates an extent to which the respective region is to be optimized. For instance, each optimization designation may indicate a respective optimization policy and/or optimization level in an optimization policy to be applied to the region to which that optimization designation is assigned. In an example implementation, assignment module 702 assigns the optimization designations to the respective regions.

In an example embodiment, an access pattern that is associated with a region indicates an extent to which the region is accessed. For instance, the extent may be based on a number of times that the region is accessed, a frequency with which the region is accessed, a time at which the region is most recently accessed, and/or a combination thereof. It will be recognized that the extent to which a region is access may be based on factor(s) in addition to or in lieu of the example factors recited above.

In another example embodiment, an access pattern that is associated with a region indicates an extent to which the region is modified. For example, the extent may be based on a number of times that the region is modified, a frequency with which the region is modified, a time at which the region is most recently modified, and/or a combination thereof. It will be recognized that the extent to which a region is modified may be based on factor(s) in addition to or in lieu of the example factors recited above.

In yet another example embodiment, each access pattern indicates a specific extent to which the respective region is accessed or modified. The specific extent is a single value that represents the actual extent (or an estimate thereof) to which the respective region is accessed or modified. For example, if a region is modified seven times, the corresponding access pattern may indicate that the region is modified seven times, approximately zero times, approximately ten times, etc. In another example, if a region is accessed 253 times per hour, the corresponding access pattern may indicate that the region is accessed 253 time per hour, approximately 200 times per hour, approximately 250 times per hour, etc.

In still another example embodiment, each access pattern indicates a general extent that includes the specific extent to which the respective region is accessed or modified. For example, if a region is modified seven times, the corresponding access pattern may indicate that the region is modified between zero and ten times, between five and twenty times, or any other suitable range of times. In another example, if a region is accessed 253 times per hour, the corresponding access pattern may indicate that the region is accessed between zero and three-hundred times, between two-hundred and four-hundred times, or any other suitable range of times.

For instance, first access pattern(s) may indicate a first general extent of zero to 100 instances of access or modification. Second access pattern(s) may indicate a second general extent of 101 to 250 instances of access or modification. Third access pattern(s) may indicate a third general extent of 251 to 500 instances of access or modification, and so on. The example ranges of the general extents described herein are provided for illustrative purposes and are not intended to be limiting. It will be recognized that a general extent may indicate any suitable range of access instances, access frequencies, access times, modification instances, modification frequencies, modification times, etc.

At step 304, each region is optimized to the extent that is indicated by the respective optimization designation that is assigned to that region. In an example implementation, optimization module 704 optimizes each region.

In an example embodiment, each region is iteratively optimized to the extent that is indicated by the respective optimization designation that is assigned to that region. For example, optimization module 704 may monitor the regions to determine changes with respect to the regions since the most recent optimization of the regions. In accordance with this example, optimization module 704 may create a differential file that includes the changes. For instance, optimization module 704 may optimize the regions on a periodic basis.

Figure 4:
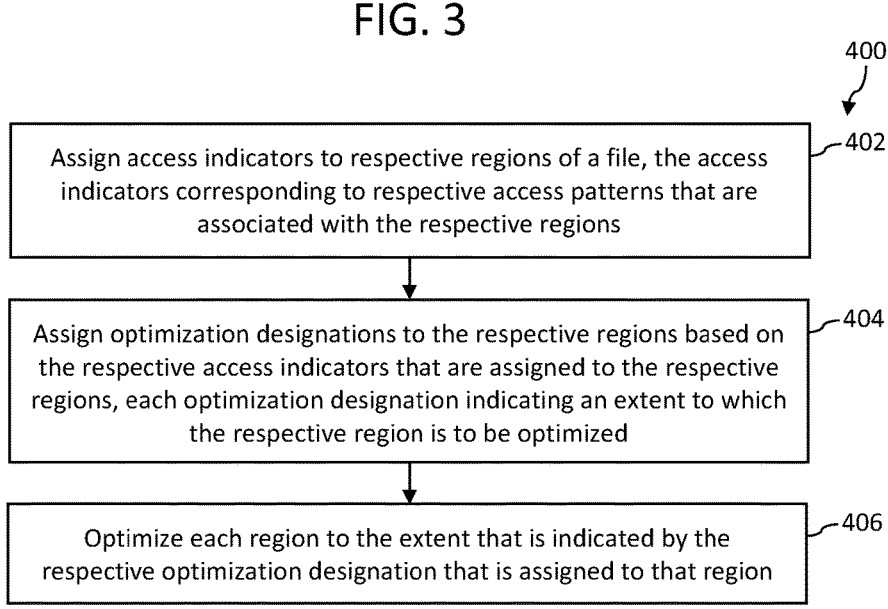

As shown in FIG. 4, the method of flowchart 400 begins at step 402. In step 402, access indicators are assigned to the respective regions of a file. The access indicators correspond to respective access patterns that are associated with the respective regions. In an example implementation, assignment module 702 assigns the access indicators to the respective regions.

In an example embodiment, access indicators having a first common value (e.g., one) are assigned to a first subset of the regions. Regions that are included in the first subset are associated with respective access patterns that satisfy at least one first criterion (e.g., most recent access time more than one day ago). Access indicators having a second common value (e.g., two) are assigned to a second subset of the regions. Regions that are included in the second subset are associated with respective access patterns that satisfy at least one second criterion (e.g., most recent access time more than one hour ago but less than one day ago). Access indicators having a third common value (e.g., three) are assigned to a third subset of the regions. Regions that are included in the third subset are associated with respective access patterns that satisfy at least one third criterion (e.g., most recent access time less than one hour ago). Three subsets of regions are described with respect to this example embodiment for illustrative purposes and are not intended to be limiting. It will be recognized that the example embodiment may include any number of subsets of regions corresponding to any number of respective criteria.

At step 404, optimization designations are assigned to the respective regions based on the respective access indicators that are assigned to the respective regions. Each optimization designation indicates an extent to which the respective region is to be optimized. In an example implementation, assignment module 702 assigns the optimization designations to the respective regions.

In an example embodiment, each optimization designation may be associated with a respective latency. For instance, if a first optimization designation indicates that a first type of optimization operation is to be performed with respect to a region to which the first optimization designation is assigned, a first latency that is expected with regard to the first type of optimization operation may be associated with the first optimization designation. If a second optimization designation indicates that a second type of optimization operation is to be performed with respect to a region to which the second optimization designation is assigned, a second latency that is expected with regard to the second type of optimization operation may be associated with the second optimization designation, and so on.

In accordance with this example embodiment, a latency threshold may be associated with each access indicator. For instance, it may be determined that a system is capable of tolerating a first latency with respect to accessing regions to which respective access indicators that have a first value are assigned. It may be further determined that a system is capable of tolerating a second latency with respect to accessing regions to which respective access indicators that have a second value are assigned, and so on. The first latency may correspond to a first latency threshold; the second latency may correspond to a second latency threshold, and so on. Accordingly, each optimization designation may be assigned to the respective region based on a latency that is associated with the respective optimization designation being less than a latency threshold that is associated with the access indicator that is assigned to that region.

In another example embodiment, each optimization designation may be associated with a respective amount of system resource consumption. For instance, if a first optimization designation indicates that a first type of optimization operation is to be performed with respect to a region to which the first optimization designation is assigned, a first amount of system resource consumption that is expected with regard to the first type of optimization operation may be associated with the first optimization designation. If a second optimization designation indicates that a second type of optimization operation is to be performed with respect to a region to which the second optimization designation is assigned, a second amount of system resource consumption that is expected with regard to the second type of optimization operation may be associated with the second optimization designation, and so on.

In accordance with this example embodiment, a consumption threshold may be associated with each access indicator. For instance, it may be determined that a system is capable of tolerating a first amount of system resource consumption with respect to accessing regions to which respective access indicators that have a first value are assigned. It may be further determined that a system is capable of tolerating a second amount of system resource consumption with respect to accessing regions to which respective access indicators that have a second value are assigned, and so on. The first amount of system resource consumption may correspond to a first consumption threshold; the second amount of system resource consumption may correspond to a second consumption threshold, and so on. Accordingly, each optimization designation may be assigned to the respective region based on an amount of system resource consumption that is associated with the respective optimization designation being less than a consumption threshold that is associated with the access indicator that is assigned to that region.

In yet another example embodiment, first optimization designations are assigned to a first subset of the regions based on first access indicators that correspond to a first range of values being assigned to the respective regions that are included in the first subset. Second optimization designations are assigned to a second subset of the regions based on second access indicators that correspond to a second range of values being assigned to the respective regions that are included in the second subset, and so on. In accordance with this example embodiment, the first optimization designations may indicate a first common extent to which the respective regions that are included in the first subset are to be optimized. The second optimization designations may indicate a second common extent to which the respective regions that are included in the second subset are to be optimized, and so on.

At step 406, each region is optimized to the extent that is indicated by the respective optimization designation that is assigned to that region. In an example implementation, optimization module 704 optimizes each region.

In some example embodiments, one or more steps 402, 404, and/or 406 of flowchart 400 may not be performed. Moreover, steps in addition to or in lieu of steps 402, 404, and/or 406 may be performed.

Figure 5:
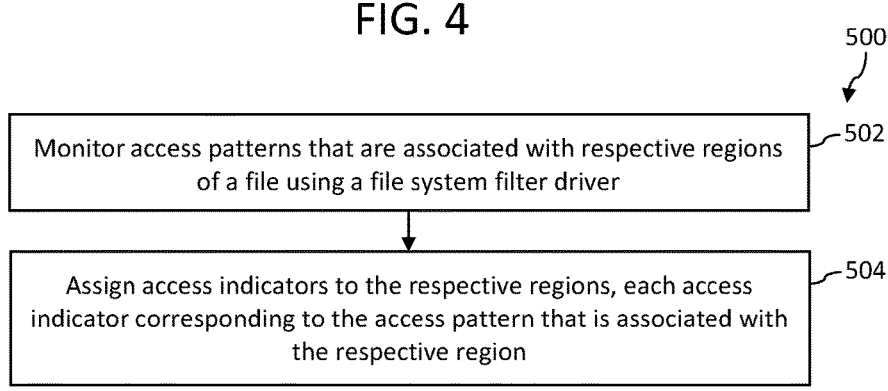

In an example embodiment, instead of performing step 402 of flowchart 400, the steps of flowchart 500 in FIG. 5 are performed. As shown in FIG. 5, the method of flowchart 500 begins at step 502. In step 502, access patterns that are associated with respective regions of a file are monitored using a file system filter driver. A file system filter driver intercepts requests that are targeted at a file system or another file system filter driver. By intercepting a request before it reaches its intended target, a file system filter driver can extend and/or replace functionality provided by the original target of the request. Examples of a file system filter driver include but are not limited to an anti-virus filter, a backup agent, an encryption module, etc. In an example implementation, access monitor 706 monitors the extent to which each of the plurality of regions is accessed.

At step 504, access indicators are assigned to the respective regions. Each access indicator corresponds to the access pattern that is associated with the respective region. In an example implementation, assignment module 702 assigns the access indicators to the respective regions.

Figure 6:
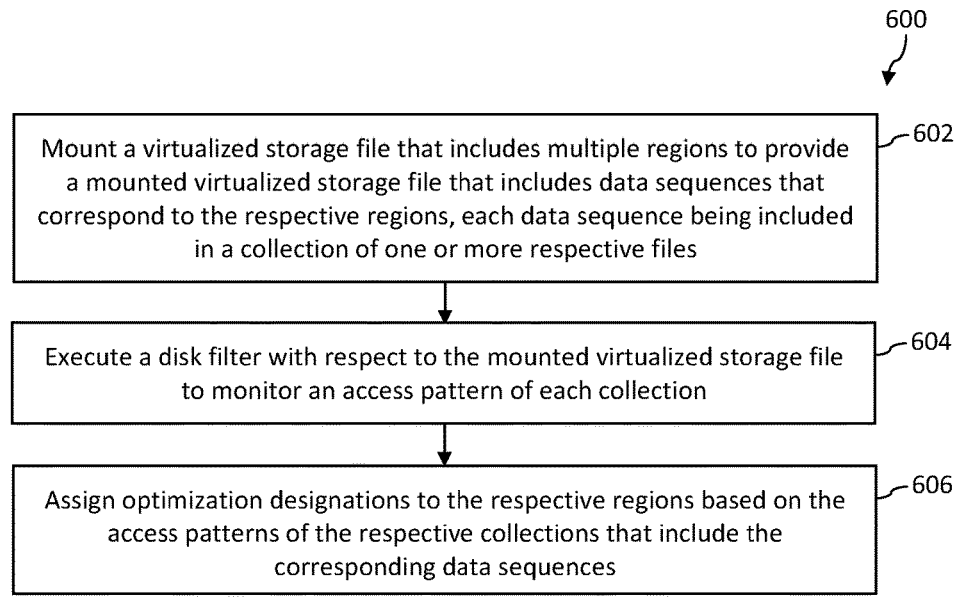
Figure 7:
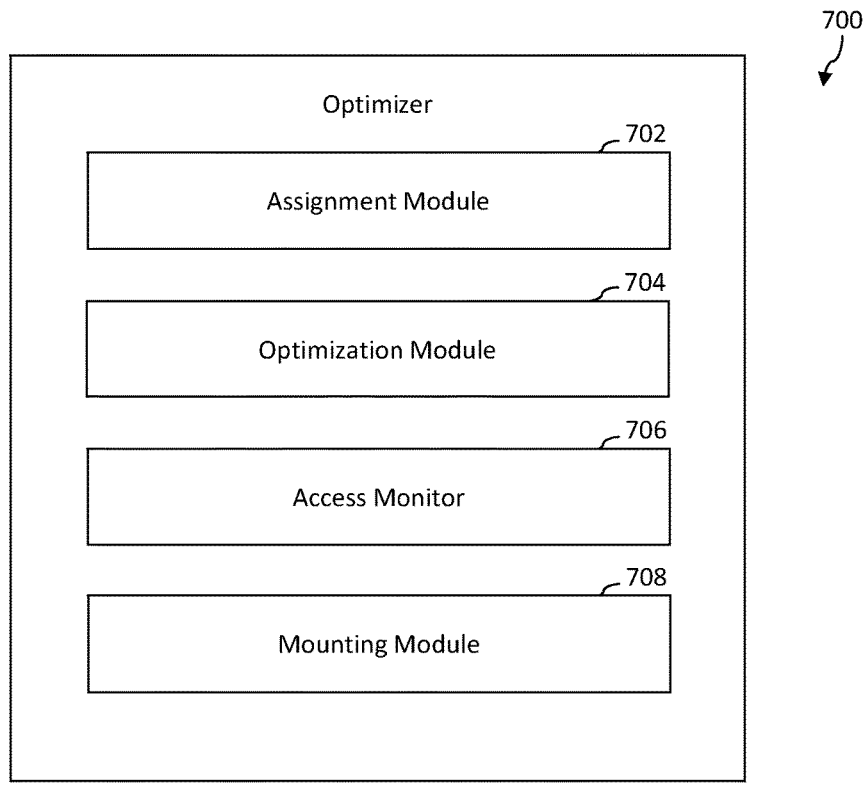
FIG. 7 is a block diagram of an example implementation of an optimizer shown in FIG. 1 in accordance with an embodiment.

In another example embodiment, instead of performing steps 402 and 404 of flowchart 400, the steps of flowchart 600 in FIG. 6 are performed. As shown in FIG. 6, the method of flowchart 600 begins at step 602. In step 602, a virtualized storage file that includes multiple regions is mounted to provide a mounted virtualized storage file that includes data sequences that correspond to the respective regions. Each data sequence is included in a collection of one or more respective files. In an example implementation, mounting module 708 mounts the virtualized storage file to provide the mounted virtualized storage file.

At step 604, a disk filter is executed with respect to the mounted virtualized storage file to monitor an access pattern of each collection. A disk filter intercepts requests that are targeted at a virtual or physical disk. By intercepting requests before they reach their intended target, the disk filter can determine information (e.g., access patterns) regarding hosted files that are included in the intended target. In an example implementation, access monitor 706 executes the disk filter with respect to the mounted virtualized storage file.

At step 606, optimization designations are assigned to the respective regions based on the access patterns of the respective collections that include the corresponding data sequences. In an example implementation, assignment module 702 assigns the optimization designations to the respective regions.

It will be recognized that optimizer 700 may not include one or more of assignment module 702, optimization module 704, access monitor 706, and/or mounting module 708. Furthermore, optimizer 700 may include modules in addition to or in lieu of assignment module 702, optimization module 704, access monitor 706, and/or mounting module 708.

Assignment module 702, optimization module 704, access monitor 706, and mounting module 708 may be implemented in hardware, software, firmware, or any combination thereof. For example, assignment module 702, optimization module 704, access monitor 706, and/or mounting module 708 may be implemented as computer program code configured to be executed in one or more processors. In another example, assignment module 702, optimization module 704, access monitor 706, and/or mounting module 708 may be implemented as hardware logic/electrical circuitry.

Figure 8:
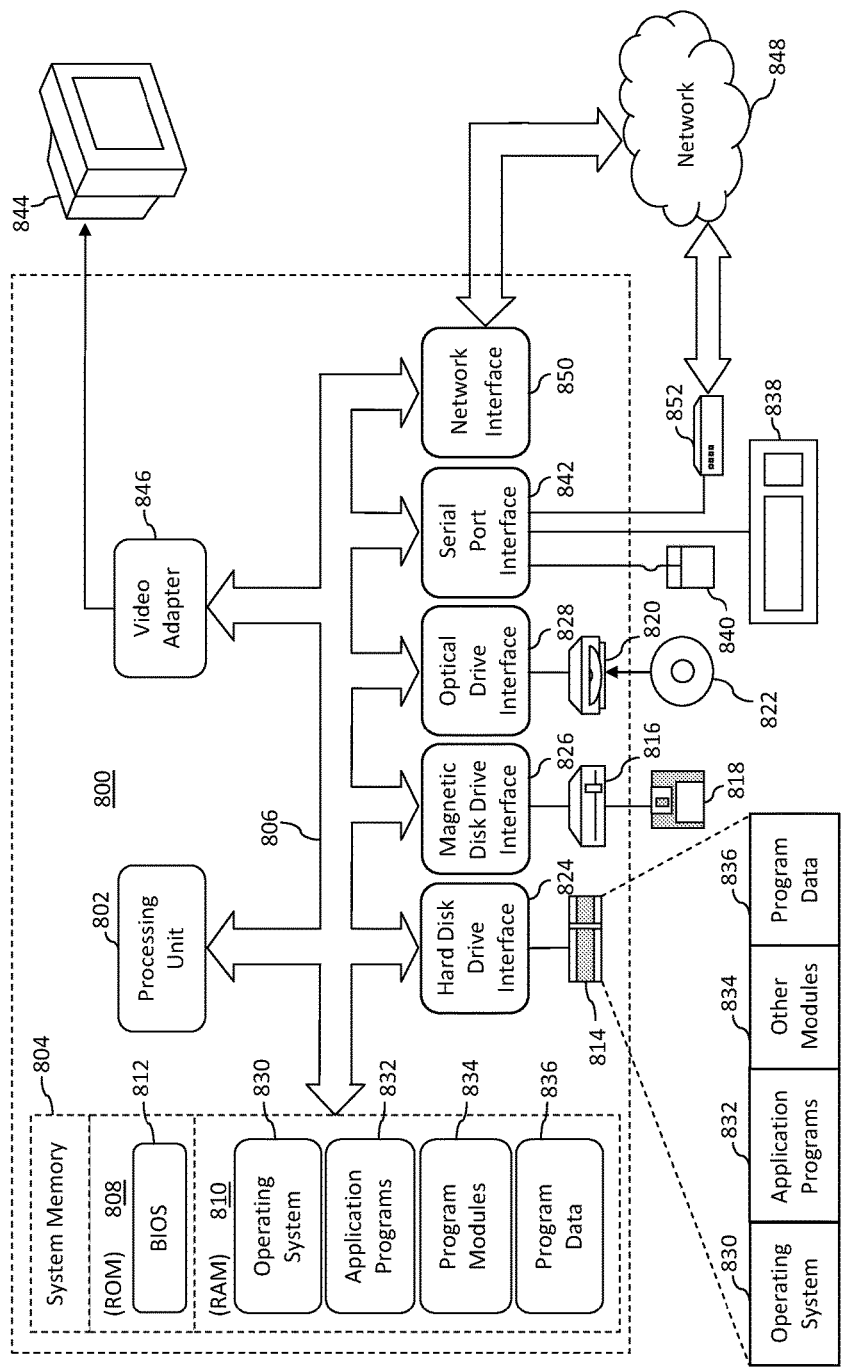
FIG. 8 depicts an example computer in which embodiments may be implemented.

FIG. 8 depicts an example computer 800 in which embodiments may be implemented. Any one or more of devices 100 and 200 shown in respective FIGS. 1 and 2 (or any one or more subcomponents thereof shown in FIG. 7) may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing assignment module 702, optimization module 704, access monitor 706, mounting module 708, flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable medium" are used to generally refer to media such as the hard disk associated with hard disk drive 814, removable magnetic disk 818, removable optical disk 822, as well as other media such as flash memory cards, digital video disks, random access memories (RAMs), read only memories (ROM), and the like.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

III. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described example embodiments, but should be defined only in accordance with the following claims and their equivalents.

What is claimed is:

1. A method comprising:
assigning a plurality of optimization designations to a plurality of respective regions of a file based on a plurality of access patterns that is associated with the plurality of respective regions, each optimization designation indicating an extent to which the respective region is to be optimized, at least one optimization designation of the plurality of optimization designations indicating the extent to which the respective region is to be optimized in accordance with at least one of a specified compression technique, which is selected from a plurality of compression techniques that are capable of compressing the respective region based on the access pattern that is associated with the respective region, or a specified data de-duplication technique, which is selected from a plurality of data de-duplication techniques that are capable of de-duplicating the respective region based on the access pattern that is associated with the respective region, each access pattern at least one of indicating or describing at least one of the following:
   (a) one or more accesses to the respective region with which the respective access pattern is associated,
   (b) one or more modifications to the respective region with which the respective access pattern is associated; and
optimizing, using at least one of (A) one or more processors or (B) hardware logic/electrical circuitry, each region to the extent that is indicated by the respective optimization designation that is assigned to that region.

2. The method of claim 1, wherein assigning the plurality of optimization designations comprises:
assigning the plurality of optimization designations to the plurality of respective regions of a virtualized storage file.

3. The method of claim 1, wherein assigning the plurality of optimization designations comprises:
assigning the plurality of optimization designations to the plurality of respective regions of a database file.

4. The method of claim 1, wherein assigning the plurality of optimization designations comprises:
assigning each optimization designation to the respective region further based on a latency that is associated with accessing that region.

5. The method of claim 1, wherein assigning the plurality of optimization designations comprises:
assigning each optimization designation to the respective region further based on an amount of system resources that is utilized to access that region.

6. The method of claim 1, wherein assigning the plurality of optimization designations comprises:
assigning each optimization designation to the respective region based on at least one of a number of times that the respective region is accessed or a number of times that the respective region is modified.

7. The method of claim 1, wherein assigning the plurality of optimization designations comprises:
assigning each optimization designation to the respective region based on at least one of a frequency with which the respective region is accessed or a frequency with which the respective region is modified.

8. The method of claim 1, wherein assigning the plurality of optimization designations comprises:
assigning each optimization designation to the respective region based on at least one of a time at which the respective region is most recently accessed or a time at which the respective region is most recently modified.

9. The method of claim 1, wherein assigning the plurality of optimization designations comprises:
assigning each optimization designation to the respective region based on whether the respective region is accessed in response to mounting an operating system that uses the respective region.

10. The method of claim 1, wherein assigning the plurality of optimization designations comprises:

assigning each optimization designation to the respective region based on whether the respective region is accessed by a specified application.

11. The method of claim 1, wherein optimizing each region comprises:
iteratively optimizing each region to the extent that is indicated by the respective optimization designation that is assigned to that region.

12. A system comprising:
memory; and
one or more processors coupled to the memory, the one or more processors configured to:
assign a plurality of optimization designations to a plurality of respective regions of a file based on a plurality of access patterns that is associated with the plurality of respective regions, each optimization designation indicating an extent to which the respective region is to be optimized based on the access pattern that is associated with the respective region, at least a first optimization designation of the plurality of optimization designations indicating the extent to which the respective region is to be optimized in accordance with a specified compression technique, which is selected from a plurality of compression techniques that are capable of compressing the respective region, at least a second optimization designation of the plurality of optimization designations indicating a specified data de-duplication technique, which is selected from a plurality of data de-duplication techniques that are capable of de-duplicating the respective region, each access pattern at least one of indicating or describing at least one of the following:
(a) one or more accesses to the respective region with which the respective access pattern is associated,
(b) one or more modifications to the respective region with which the respective access pattern is associated; and
optimize each region to the extent that is indicated by the respective optimization designation that is assigned to that region.

13. The system of claim 12, wherein the one or more processors are configured to assign each optimization designation to the respective region further based on at least one of a latency that is associated with accessing that region or an amount of system resources that is utilized to access that region.

14. A computer program product comprising a computer-readable storage medium, which is not a signal, having computer program logic recorded thereon for enabling a processor-based system to optimize a file by performing operations, the operations comprising:
assign a plurality of optimization designations to a plurality of respective regions of a file based on a plurality of access patterns that is associated with the plurality of respective regions and further based on a plurality of latencies that is associated with accessing the plurality of respective regions, each optimization designation indicating an extent to which the respective region is to be optimized, at least one optimization designation of the plurality of optimization designations indicating the extent to which the respective region is to be optimized in accordance with at least one of a specified compression technique, which is selected from a plurality of compression techniques that are capable of compressing the respective region based on the access pattern that is associated with the respective region, or a specified data de-duplication technique, which is selected from a plurality of data de-duplication techniques that are capable of de-duplicating the respective region based on the access pattern that is associated with the respective region, each access pattern at least one of indicating or describing at least one of the following:
(a) one or more accesses to the respective region with which the respective access pattern is associated,
(b) one or more modifications to the respective region with which the respective access pattern is associated; and
optimize each region to the extent that is indicated by the respective optimization designation that is assigned to that region.

15. The method of claim 1, wherein the at least one optimization designation indicates the extent to which the respective region is to be optimized in accordance with the specified compression technique, which is selected from the plurality of compression techniques based on the access pattern that is associated with the respective region, in response to a determination that the respective region is to be compressed.

16. The method of claim 1, wherein the at least one optimization designation indicates the extent to which the respective region is to be optimized in accordance with the specified data de-duplication technique, which is selected from the plurality of data de-duplication techniques based on the access pattern that is associated with the respective region, in response to a determination that the respective region is to be de-duplicated.

17. The method of claim 1, wherein the at least one optimization designation indicates the extent to which the respective region is to be optimized in accordance with the specified compression technique, which is selected from the plurality of compression techniques based on the access pattern that is associated with the respective region; and
wherein at least one second optimization designation of the plurality of optimization designations indicates the extent to which the respective region is to be optimized in accordance with a designated data de-duplication technique, which is selected from the plurality of data de-duplication techniques or a second plurality of data de-duplication techniques based on the access pattern that is associated with the respective region.

18. The system of claim 12, wherein at least one of the following is true:
(a) the first optimization designation indicates that the respective region is to be compressed but not de-duplicated,
(b) the second optimization designation indicates that the respective region is to be de-duplicated but not compressed.

19. The method of claim 1, further comprising:
monitoring the plurality of access patterns that is associated with the plurality of respective regions using a file system filter driver;
wherein assigning the plurality of optimization designations comprises:
assigning the plurality of optimization designations to the plurality of respective regions in response to monitoring the plurality of access patterns that is associated with the plurality of respective regions.

20. The method of claim 1, wherein the file is a virtualized storage file;
wherein the method further comprises:
mounting the virtualized storage file to provide a mounted virtualized storage file that includes a plurality of data sequences that corresponds to the plurality of respective regions, each data sequence being included in a collection of one or more respective files, and executing a disk filter with respect to the mounted virtualized storage file to monitor an access pattern of each collection; and wherein assigning the plurality of optimization designations comprises:

assigning each optimization designation to the respective region of the virtualized storage file based on the access pattern of the respective collection that includes the corresponding data sequence.

21. The method of claim 1, further comprising:

assigning a plurality of access indicators to the plurality of respective regions, each access indicator corresponding to the access pattern that is associated with the respective region;

wherein assigning the plurality of optimization designations comprises:

assigning each optimization designation to the respective region based on a latency that is associated with the respective optimization designation being less than a latency threshold that is associated with the access indicator that is assigned to that region.

22. The system of claim 12, wherein the file is a virtualized storage file; and wherein the one or more processors are configured to:

mount the virtualized storage file to provide a mounted virtualized storage file that includes a plurality of data sequences that corresponds to the plurality of respective regions, each data sequence being included in a collection of one or more respective files;

execute a disk filter with respect to the mounted virtualized storage file to monitor an access pattern of each collection; and assign each optimization designation to the respective region of the virtualized storage file based on the access pattern of the respective collection that includes the corresponding data sequence.

23. The system of claim 12, wherein the one or more processors are configured to:

assign a plurality of access indicators to the plurality of respective regions, each access indicator corresponding to the access pattern that is associated with the respective region; and assign each optimization designation to the respective region based on a latency that is associated with the respective optimization designation being less than a latency threshold that is associated with the access indicator that is assigned to that region.

24. The system of claim 12, wherein the one or more processors are configured to:

assign a plurality of access indicators to the plurality of respective regions, each access indicator corresponding to the access pattern that is associated with the respective region; and assign each optimization designation to the respective region based on an amount of system resource consumption that is associated with the respective optimization designation being less than a consumption threshold that is associated with the access indicator that is assigned to that region.

* * * * *